United States Patent [19]
Sugimura

[11] 3,779,135
[45] Dec. 18, 1973

[54] AIR PRESSURE ACTUATOR

[76] Inventor: Nobuyuki Sugimura, 1416, Sodeshi-cho, Shimizu-shi, Japan

[22] Filed: Mar. 20, 1972

[21] Appl. No.: 236,474

[30] Foreign Application Priority Data
Mar. 30, 1971 Japan.............................. 46/18891

[52] U.S. Cl............................ 91/45, 60/407, 92/15, 92/28, 60/413
[51] Int. Cl............................................ F15b 15/26
[58] Field of Search .................. 91/45; 60/407, 406, 60/413, DIG. 10; 92/15, 21, 27, 28

[56] References Cited
UNITED STATES PATENTS

| | | | |
|---|---|---|---|
| 242,634 | 6/1881 | Guild et al. | 91/45 |
| 1,734,795 | 11/1929 | Claxton | 91/45 |
| 2,698,157 | 12/1954 | Ludeman | 91/45 X |
| 2,891,514 | 6/1959 | Moeller | 91/45 X |

Primary Examiner—Edgar W. Geoghegan
Attorney—Morsbach, Pillote & Muir

[57] ABSTRACT

An air pressure actuator comprises an air pressure cylinder having a piston slidable therein. A brake is provided at a position where the air pressure cylinder and piston make relative movement, thus stopping their movement. When the movement of the piston in the cylinder is to be halted at a predetermined position, this is effected by the brake so as to constrain the piston correctly relative to the air pressure cylinder. Said brake is formed by an hydraulic cylinder and an hydraulic piston actuated in association with relative movement of the air pressure cylinder and air pressure piston. Alternatively the brake is formed by a retractable braking element housed in the air pressure piston.

8 Claims, 6 Drawing Figures

3,779,135

AIR PRESSURE ACTUATOR

This invention relates to a device for controlling the movement of a movable part of an air pressure actuator or the like.

Since the air pressure actuator or the like is actuated with compressed air, the piston tends to randomly move with the elastic nature of air when the air supply to the cylinder is stopped by closing the air valve. This results in a low accuracy of the air pressure actuators or the like, and it is not suitable for use in positioning and indexing work which requires a high degree of accuracy.

One object of the present invention is to provide a device in which a piston in the cylinder is brought to a halt accurately without any reaction when the supply of air to the cylinder is stopped by the closing of a control valve.

Another object of the present invention is to provide an air pressure actuator in which the piston in the air pressure cylinder is enabled to continuous set at a desired position.

To achieve these objects, the air pressure actuator of the present invention provides an air pressure cylinder wherein a pressure actuated piston is slidably placed, and a brake means is provided between the air cylinder and piston to control their relative movements.

Details of the present invention will become apparent as the description proceeds, with reference to the accompanying drawings in which five embodiments are shown.

Figure 1:
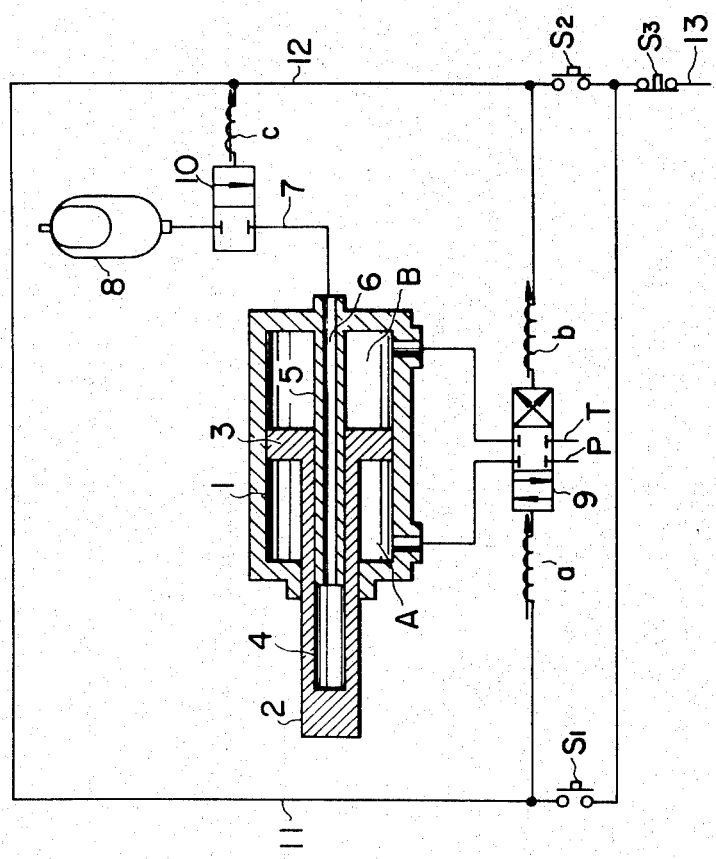
FIG. 1 is a view, in part sectional and in part diagrammatic, of an air actuator and a fluid circuit of a first embodiment.

In FIG. 1, there is illustrated an air cylinder 1 in which a piston rod 2 having a piston 3 is reciprocated by air pressure supplied to air chambers A and B. A single-acting hydraulic cylinder 4 is formed in a bore extending through the rod 2 and piston 3 of the air cylinder 1. This hydraulic cylinder has a hollow plunger 5 secured at its one end to an end plate of the air cylinder 1. An inside bore 6 of the plunger 5 is communicated through a liquid passage 7 to an accumulator 8. An air valve 9 controls the air supply to the air cylinder 1 upon electrical actuation of left and right solenoids $a$ and $b$. In this manner, the chambers A and B of the air cylinder 1 are selectively communicated to an air pressure system P and a discharge system T, respectively; thus the piston 3 is moved in either direction. A liquid valve 10 is provided in the liquid passage 7, said valve being opened during the time when its solenoid $C$ is energized and closed when the solenoid is deenergized.

An electric circuit 11 connects the left side solenoid $a$ of the air valve 9 to the solenoid $c$ of the liquid valve 10. By operation of a control switch $S_1$, these solenoids $a$ and $c$ are concurrently energized. An electric circuit 12 connects the right side solenoid $b$ and the solenoid $c$ of the liquid valve 10 and, by operation of the control switch $S_2$, the solenoids $b$ and $c$ are concurrently energized. An electric source circuit 13 is connected to both electric supply circuits 11, 12 through a switch $S_3$.

In the embodiment shown in FIG. 1, when the control switch $S_1$ is closed to energize the left side solenoid $a$, the air valve 9 is operated to communicate the air chamber A of the air cylinder 1 to the pressure system P, and to communicate the air chamber B to the air discharge system T. Concurrently, solenoid $c$ is energized and the liquid valve 10 is opened to deliver liquid from the hydraulic cylinder 4 to the accumulator 8 to be stored therein. As a result, despite the fact that the piston 3 is moved by air pressure, there is no abrupt shock, rather it starts smoothly by the pressure of air supplied to the air chamber A while the air in the other chamber B is quietly discharged. Thus the work is done very securely. When the solenoids $a$ and $c$ are deenergized by switching off the electric source 13, the control valve 9 blocks the air chambers A, B of the cylinder 1 to prevent the flow of air in and out respectively. At the smae time, the valve 10 is closed to cut off communication between the hydraulic cylinder 4 and accumulator 9, and a non-compressive liquid is sealed in the hydraulic cylinder 4. This immediately halts movement of the hydraulic cylinder 4 and, as a result, the air piston 3 housing said cylinder 4 is also stopped from moving. Thus the piston 3 halts in a desired position and the movement of the piston is not affected by the compressive nature of air as it is compensated by the sealed-in liquid in the hydraulic cylinder 4. This enables the apparatus to work very smoothly and very accurately.

Figure 2:
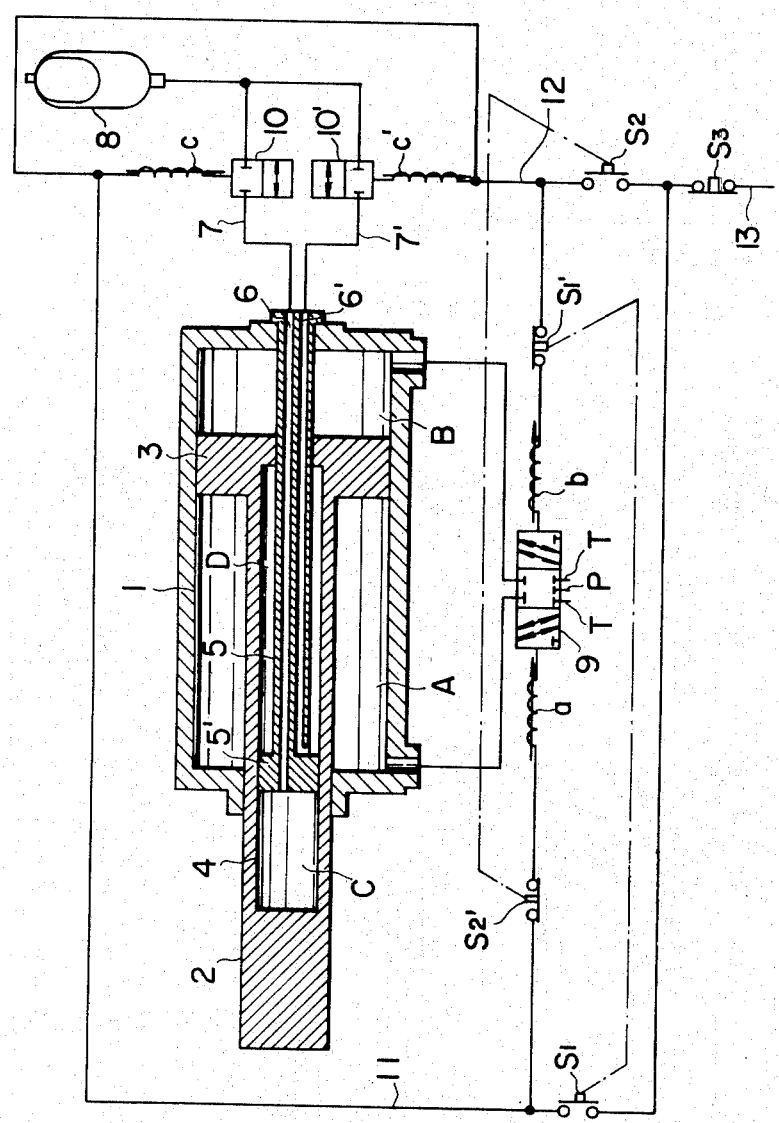
FIG. 2 is a view, in part sectional and in part diagrammatic, of an air actuator and a fluid circuit of a second embodiment.

In FIG. 2, there is shown another embodiment of the air cylinder 1, inside of which the rod 2 and piston 3 are reciprocated by air pressure supplied to the air chambers A and B. A double-acting hydraulic cylinder 4 is formed in a bore of the rod 2 and piston 3 of the air cylinder 1. In this embodiment, hydraulic cylinder 4 has a piston 5' mounted on a rod 5 which is secured to the end wall of the air cylinder 1. Additionally, in the inside of the rod 5, two liquid channels 6 and 6' are provided. Channel 6 opens at the outer face of the piston 5' and the other channel 6' opens at the inner face of the piston 5'. These channels 6, 6' communicate with liquid passages 7, 7' respectively, which both lead to the accumulator 8. An air valve 9 is actuated by the left and right side solenoids $a$, $b$, so that the air chambers A and B are selectively communicated to the air pressure system P and air discharge system T respectively to reciprocate the piston 3. Control valves 10, 10' are provided in the liquid passage 7, 7' respectively. Each valve is opened when solenoids $c$ and $c'$ are energized and closed when said solenoids are deenergized.

An electric circuit 11 connects the left side solenoid $a$ to the solenoids $c$, $c'$ of the control valve 10, 10' and, when the control switch $S_1$ is operated, the three solenoids $a$, $c$, and $c'$ are concurrently energized. An electric circuit 12 connects the right side solenoid $b$ of the control valve 9 to the solenoids $c$, $c'$ of the control valves 10, 10' and, when the control switch $S_2$ is operated, the three solenoids $b$, $c$, and $c'$ are concurrently energized. An electric source circuit 13 is connected to both electric supply circuits 11, 12 and provided with an electric source switch $S_3$. Shut-off switches $S_1'$ and $S_2'$ are provided in the respective circuits leading from the solenoids $a$, $b$ of the control valve 9. Switch $S_1'$ is simultaneously operated with switch $S_1$; and switch $S_2'$ simultaneously with switch $S_2$. When switches $S_1$, $S_2$ are turned on, the other switches are off; thus, concurrent energization to the solenoids $a$, $b$ is avoided.

When the switch $S_1$ in the electric circuit 11 is operated to energize the solenoid $a$ of the control valve 9 and solenoids $c$, $c'$ of the liquid valve 10, the control valve 9 is simultaneously operated to allow the air chamber A of air cylinder 1 to communicate with the air pressure system P, and the other chamber B of the air cylinder communicates with the air discharge system T. Concurrently the liquid valves 10, 10' open to communicate a liquid chamber C at one side of the liquid cylinder 4 with a liquid chamber D at the other side. Thus liquid of a non-compressive nature flows from the chamber C to chamber D. As a result, despite the fact that the piston 3 is forced by air of a compressive nature, it is not subjected to an abrupt shock; rather, it starts with smooth movement to discharge air from the chamber B. When the solenoids $a$, $c$, and $c'$ are deenergized by throwing the switch $S_1$, the control valve 9 blocks the air supply to and discharge from the air chambers A, B of the air cylinder 1. At the same time, the check valves 10, 10' and liquid passage 7, 7' are closed, whereupon liquid of a non-compressive nature is sealed in the liquid chambers C, D. Movement in liquid cylinder 4 is instantly stopped by sealed-in liquid which halts the movement of the piston 3 housed in this cylinder 4. Thus the piston 3, when moving in a rightward direction, will not cause any abrupt shock nor will the compressive nature of air cause it to be random at its stopped position.

Similarly, when the control switch $S_2$ of the electric circuit 12 is operated to energize the other solenoid $b$, the control valve 9 is actuated to communicate the air chamber B of air cylinder 1 with the pressure air system P and communicate the air chamber A with air discharge system T respectively. Concurrently solenoids $c$, $c'$ are actuated and the check valves 10, 10' are opened to communicate liquid passages 7, 7' with each other. The piston 3 starts moving under force of compressed air, but without any abrupt shock due to the presence of liquid of a non-compressive nature in chambers C, D. When the solenoids $b$, $c$, and $c'$ are deenergized by throwing the control switch $S_2$, flow to the air cylinder 1 is blocked by the closure of the valve 9 and concurrently liquid passages 7, 7' are blocked. In this manner, liquid of a non-compressive nature is sealed in the liquid chambers C, D. This stops the movement in the cylinder 4 and instantly halts the piston 3.

When the double-acting hydraulic cylinder 4 is used, abrupt shock to the piston 3 is avoided and its movement can be halted in either direction in an exact correct position. Thus this apparatus can work in a very precise manner, comparable with any hydraulically operated apparatus.

Figure 3:
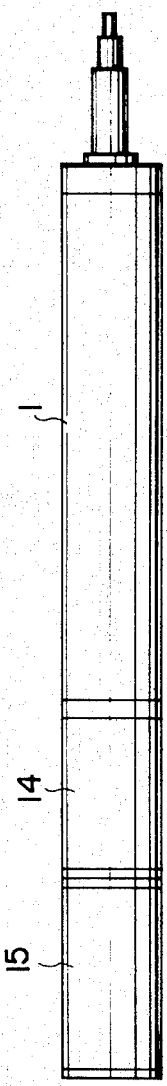
FIG. 3 is an elevational view of a third embodiment.

Referring to FIG. 3, an air cylinder 1 is arranged in tandem with a control valve 14, and an accumulator 15. With this arrangement, the whole system can be made in a compact size.

Figure 4:
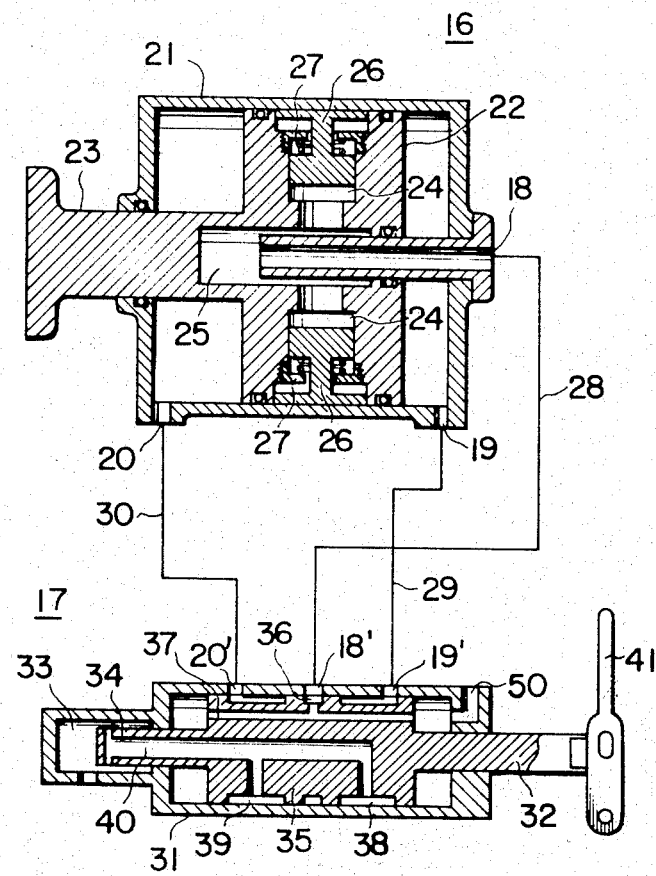
FIG. 4 is a view, in part sectional and in part diagrammatic, of an air actuator and a fluid circuit of a fourth embodiment.

Turning to FIG. 4, a reciprocable air actuator 16 has ports 19 and 20 provided at its opposite ends to let air in and out. A piston 22 is reciprocated in a cylinder 21 by air pressure delivered through the ports 19, 20, A piston rod 23 of piston 22 delivers movement of the piston to the object to be driven. A brake cylinder 24 is provided in desired numbers and, in such instance, the cylinders 24 may be communicated to one another through a bore 25. When an actuating fluid is supplied to the brake cylinder 24, a brake piston 26 is urged against the cylinder 21 to brake the piston 22. When the supply of fluid is stopped, brake piston 26 returns to the original position by action of a spring 27, and the brake is released. A fluid supply cylinder 18 is positioned in the bore 25 of the piston 22 to allow fluid coming therethrough to communicate with the brake cylinder 24.

For controlling the operation of the above-described air actuator 16 or a rotary actuator 56 hereinafter described, there is provided a control valve 17. Control valve 17 includes a valve cylinder 31, at the center of which is a central orifice 18' which communicates through a conduit 28 to the fluid supply cylinder 18. At the right side of the valve cylinder 31, is an orifice 19' which communicates through a conduit 29 to the port 19 of the cylinder 21. At the left side thereof, an orifice 20' is provided to communicate through a conduit 30 to the port 20 of actuator cylinder 21. At the right end of the control valve 17, a pressure orifice 50 is provided for communicating with a pressure system.

A piston valve 35 is inserted in the valve cylinder 31, and a rod 32 at one end of the piston 35 projects through one end of the valve cylinder 31. A plunger 34 at the other end of the piston 35 projects into a drain chamber 33 formed in the other end of the valve cylinder 31. At the center of the piston valve 35, a hole 36 is provided to register with the central orifice 18'. This hole 36 communicates through an axial bore 37 in the piston valve 35 to chambers at the opposite ends of the valve cylinder 31. Axially spaced from the central hole 36 are annular grooves 38, 39 to be communicated with ports 19', 20', respectively, when the piston valve 35 is moved in opposite directions as described below.

A lever 41 is associated with the rod 32 to selectively position the piston valve 35. When it is positioned in a neutral position as shown in FIG. 4, the piston valve 35 rests in the middle of the valve cylinder 31. In this position, both orifices 19', 20' are communicated through a drain bore 40 to the drain chamber 33, while the central orifice 18' is communicated to the pressure port 50. Fluid under pressure is thereby supplied through the conduit 28 and supply cylinder 18 to the brake cylinder 24; and thus the brake piston 26 is urged against the cylinder 21 to brake movement of the piston 22.

When the lever 41 is turned to the left and piston valve 35 is moved to the left in the valve cylinder 31, the left orifice 20' and central orifice 18' are communicated through the drain bore 40 to the drain chamber 33. In this instance, the brake piston 26 is returned by a spring 27, and the brake to the piston 22 is released. Simultaneously the right orifice 19' is communicated with the pressure port 50 and air pressure is supplied to the cylinder 21 through its port 19. The piston 22 with its rod 23 is thereby moved to the left to drive the object.

After the work has been done to the driven object, the lever 41 is returned to its neutral position to move the piston valve 35 to the middle of the valve cylinder 31. As previously described, in this position both the orifices 19', 20' are communicated to the drain chamber 33 and the central orifice 18' is communicated to the pressure port 50. In this instance, since the air supply to the cylinder 21 is stopped while air is supplied to the brake cylinder 24, the brake piston 26 is forced against the cylinder 21 and the movement of the piston 22 is immediately stopped. Despite the fact that it has been accomplished by compressed air, the stopped position is definitely exact. Yet by manipulating the lever 41, the location of the stopped position is easily controlled, so the continuous stroke in a double-acting air actuator can also be controlled. With the above-described braking action of the brake cylinder, the moment of inertia caused by compressed air is totally eliminated. Thus even though this actuator is driven by air, a high degree of accuracy is obtained, comparable with that of hydraulically driven actuators.

Figure 5:
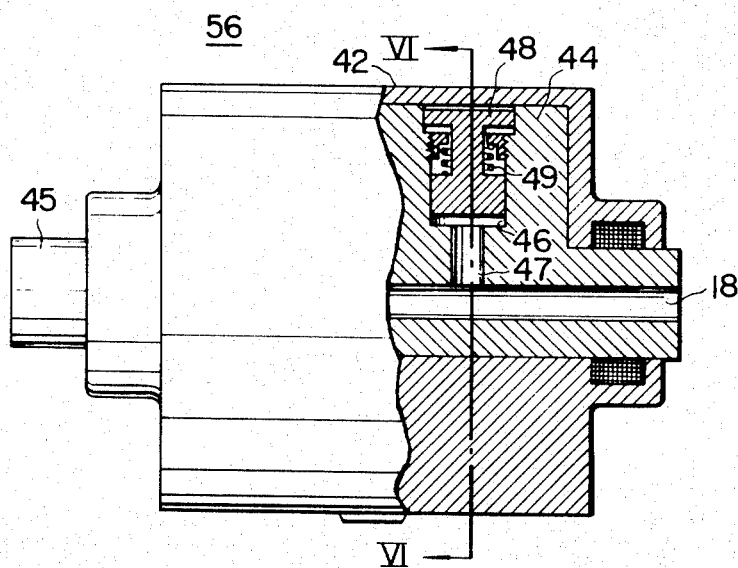
FIG. 5 is a view, in part elevational and in part sectional, of a fifth embodiment.
Figure 6:
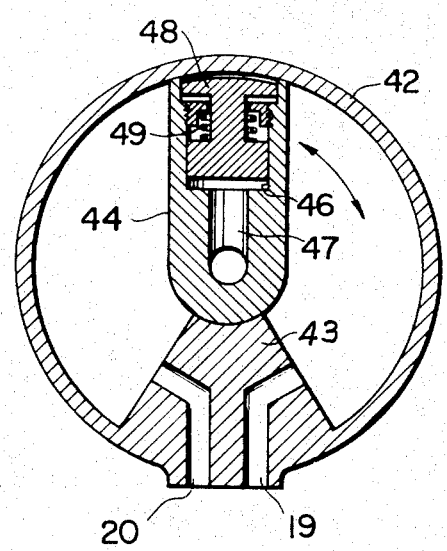
FIG. 6 is a cross-sectional view taken along the line VI—VI in FIG. 5.

In FIG. 5 and FIG. 6, there is a cylinder 42 of a rotary actuator 56. Inside the cylinder 42, a partition wall 43 is formed. An air inlet port 19 and an outlet port 20 open on opposite sides of wall 43 for letting air in and out. A piston 44 is mounted in the cylinder 42 and rotates by air pressure supplied through ports 19, 20. An output shaft 45 secures the piston 44 and delivers rotary movement of the piston to the driven object. A brake cylinder 46 is provided centripetally to the piston 44 from its circumference, and communicates to a port 47 and a fluid supply cylindrical bore 18. When actuating fluid is supplied to the brake cylinder 46, a brake piston 48 is urged against the cylinder 42 to brake the movement of piston 44, and when supply of actuating fluid is stopped, brake piston 48 is retracted by spring 49 to release the brake of the piston 44.

The control valve 17 in FIG. 4 is applied to this actuator 56. That is, the ports 19, 20 and fluid supply cylindrical bore 18 of the actuator 56 are connected to the orifices 19′, 20′ and 18′ of the control valve 17, respectively. When said ports 19, 20 are communicated to the drain chamber 33 of the control valve 17, the fluid supply bore 18, is communicated to the pressure port 50 of the control valve to supply air to the brake cylinder 46. The brake piston 48 is then urged against the inside face of the cylinder 42 by air pressure, and the piston 44 is braked and constrained from movement. By manipulation of the control valve 17, the cylindrical bore 18, for supplying fluid to the brake cylinder 46, and the port 20 in the cylinder 42 may be both communicated to the drain chamber 33, and the other port 19 communicated to the pressure port 50. This allows the brake piston 48 to be retracted by action of spring 49. The piston 44 can then rotate by air pressure delivered from the port 19 onto the cylinder 42. This movement is delivered by the output shaft 45 to a driven object.

When work has been done to the object and the control valve 17 is returned to its neutral position, the ports 19, 20 of the cylinder 42 are communicated to the drain chamber 33, while the fluid supply bore 18 is communicated to the pressure port 50. The piston 44 in cylinder 42 is braked by brake piston 48 and is stopped instantly at the desired position in its stroke, which position can be changed selectively according to the change of opertion timing of the control valve 17.

It is to be understood that the invention is not limited to these embodiments but any change or modification in the construction may be made within the scope of appended claims without departing from the spirit of this invention.

I claim:

1. An air pressure actuator comprising an air cylinder having end walls, a piston movably mounted in the air cylinder, means for selectively feeding air under pressure to opposite sides of the piston to reciprocate the piston, a piston rod secured to the piston and having a bore therein which forms a hydraulic cylinder, a second rod secured to one of the end walls of the air cylinder and extending into the hydraulic cylinder, means providing a channel through the second rod and opening to the hydraulic cylinder, and means for stopping flow of hydraulic fluid through the channel to provide an hydraulic brake for the air cylinder.

2. The combination of claim 1 wherein the last-mentioned means includes an accumulator, a conduit leading from the accumulator to the channel, and an hydraulic valve interposed in the conduit.

3. The combination of claim 2 wherein the means for selectively feeding air under pressure includes an air pressure system, and an air valve interposed in the air pressure system; and including means for simultaneously operating the air valve and the hydraulic valve.

4. The combination of claim 3 wherein the piston rod extends through the other of the end walls of the air cylinder, and wherein the second rod is coaxial with the piston rod.

5. The combination of claim 3 wherein the means providing a channel through the second rod provides only one channel, and the hydraulic valve controls flow between the accumulator to the hydraulic cylinder, whereby a single-acting hydraulic brake is provided.

6. The combination of claim 1 in which the second rod is of smaller cross-section than the hydraulic cylinder, a piston is mounted on the second rod, the means providing a channel includes a first channel opening to the hydraulic cylinder at one side of the piston and a second channel opening to the hydraulic cylinder at the other side of the piston, and the means for stopping flow of hydraulic fluid includes hydraulic valve means for simultaneously stopping flow through both first and second channels, whereby a double-acting hydraulic brake is provided.

7. The combination of claim 2 in which the air cylinder, hydraulic valve, and accumulator are arranged in series in a longitudinally-extending row.

8. An air pressure actuator comprising, in combination: an air cylinder having opposite end walls; a piston rod extending through one of the end walls and having one end disposed in the air cylinder; a piston mounted at said one end of the piston rod and separating the air cylinder into first and second air chambers; means for selectively feeding air under pressure to one of the chambers while discharging air from the other chamber, and vice versa, to reciprocate the piston and piston rod; means providing an axial bore extending through the piston and into the piston rod to form an hydraulic cylinder; a second rod secured to the other end wall of the air cylinder and disposed in the hydraulic cylinder; channel means providing at least one channel extending through the second rod from outside the air cylinder and opening to the hydraulic cylinder; a two-piston valve associated with the channel means and operable in one position to permit flow of hydraulic fluid through the channel means and operable in the second position to prevent such flow; and means for operating the valve between its two positions.

* * * * *